Figure 1:
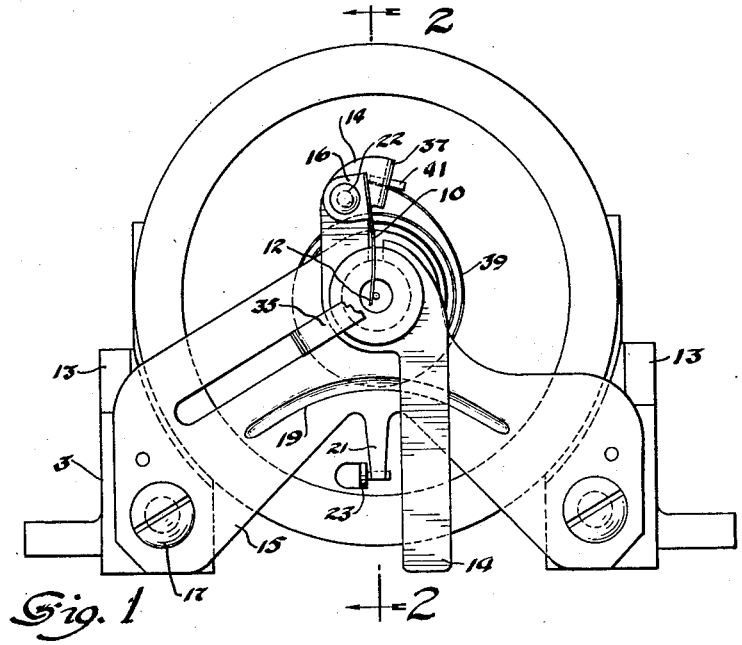

June 3, 1930.  J. ZUBATY  1,761,954

SPEED CUP DAMPENER

Filed May 12, 1928

Inventor
Joseph Zubaty
By Blackmore, Spencer & Hulse
Attorneys

Patented June 3, 1930

1,761,954

UNITED STATES PATENT OFFICE

JOSEPH ZUBATY, OF FLINT, MICHIGAN, ASSIGNOR TO A C SPARK PLUG COMPANY, OF FLINT, MICHIGAN, A COMPANY OF MICHIGAN

SPEED-CUP DAMPENER

Application filed May 12, 1928. Serial No. 277,339.

This invention relates to measuring instruments and is particularly useful with measuring instruments such as speedometers as used on motor vehicles.

An object of the invention is to provide an improvement which will render the indicating member of such an instrument more steady in its action. Other objects and advantages will appear from a reading of the following description and an examination of the accompanying drawing.

Figure 2:
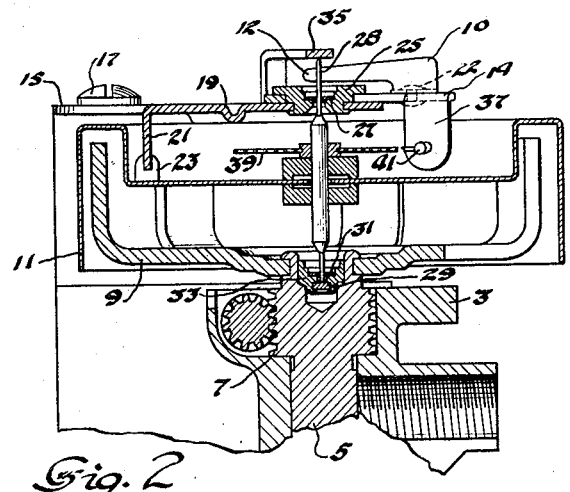

In the drawing:

Figure 1 is a top plan view of a speedometer with its casing removed, and having incorporated therein the improvement constituting the subject matter of this invention; and Figure 2 is a transverse section on line 2—2 of Figure 1.

Referring by reference characters to the drawing, there is shown a frame 3 preferably made by die casting. This frame is to support the movable parts of the speedometer and the odometer, the whole to be enclosed in a casing supported on the panel or instrument board of a vehicle. The frame rotatably carries a vertical rotor shaft 5. This shaft is provided with a gear 7 for driving, thru intermediate gearing, the odometer wheels, not shown. A rotor member 9 is carried by the rotor shaft 5, and surrounding rotor 9 is an indicating member or speed cup 11. A magnet, not shown, preferably of U-shape surrounds the indicating cup member and is supported on ledges 13.

A stamped top plate 15 is attached to the die-cast frame by fastening means 17. It is preferably formed with a strengthening rib 19. Integral with the top plate is a downwardly directed finger 21, which is to serve as a stop, the finger being engaged by an upwardly directed lug 23 integral with or secured to the indicating cup member. The top plate has an opening in which is positioned a bearing carrier 25. This carrier supports a hole jewel 27 thru which passes the reduced end of spindle 28. This spindle 28 has secured thereto the indicating or speed cup 11. At its lower end, the spindle rests on a thrust bearing 29 and engages a side bearing 31, both bearings carried by a bearing carrier 33 mounted in the open upper end of the rotor shaft 5. This arrangement for supporting and guiding the lower end of the spindle of an indicating member has been heretofore used. At 35 is shown a bent over part of top plate 15, which bent over end overlies the extreme end of spindle 28 and limits its axial movement.

Rotatably mounted, preferably about carrier 25, is a hair spring adjuster 14. This adjuster is manually rotatable and its end is down-turned as at 37, the end receiving one end of a hair spring 39 which is held in position by a wedge member 41. The other end of the hair spring is secured as usual to the spindle 28, this hair spring biasing the indicating cup 11 to a zero reading position. It will be understood that rotation of the adjusting member 14 permits the operator to give a predetermined tension to spring 39.

The construction as described, wherein the lower spindle bearing is in the rotatable rotor shaft, instead of being fixed in position, affords a very convenient method of assembly. Since, however, the lower bearing is rotatable, being carried by the rotatable shaft 5, the friction between the spindle 28 and its bearings is so greatly reduced that the indicating member becomes unsteady under certain circumstances, as, for example, on rough roads or when the car is being accelerated or when it is slowing down. It is to remedy this defect that the present invention has been made.

A brake member 10 is constructed of resilient material, such as phosphor bronze. This brake member 10 is substantially flat and has an angular face 16 at one end which is secured by rivet 22 to the hair spring adjuster 14. The member 10 extends toward the spindle and its end 12 somewhat reduced in transverse dimension lies against the spindle 28 and to a slight extent frictionally resists the rotation of the spindle in its bearings. The degree of friction is to be predetermined by suitably bending the reduced end 12 of the brake member 10, or the member 10 may be turned about the rivet 22. It will be understood that the frictional resistance is not to be excessive, not so great as to make the indicating member sluggish in its action, but there is to be sufficient resistance to check erratic movements of the indicating member at times of acceleration or deceleration and on rough roads.

I claim:

In a measuring instrument, a frame, a rotor shaft journaled therein, an indicating member having a spindle, said spindle having a plurality of bearings, one of said bearings being positioned in said frame and the other located in and rotatable with said rotor shaft, a spring to bias said indicating member to a predetermined position, a rotatable member to adjust the tension of said spring, and means rotatably carried by said spring adjusting member and frictionally engaging said spindle to steady the action of said indicating member.

In testimony whereof I affix my signature.

JOSEPH ZUBATY.